(12) United States Patent
Hartshorn et al.

(10) Patent No.: US 11,073,707 B2
(45) Date of Patent: Jul. 27, 2021

(54) DIMMABLE WINDOW APPARATUS AND VEHICLE INCLUDING THE SAME

(71) Applicant: The Boeing Company, Chicago, IL (US)

(72) Inventors: Scott D. Hartshorn, Snohomish, WA (US); Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 15/805,943

(22) Filed: Nov. 7, 2017

(65) Prior Publication Data

US 2019/0137794 A1 May 9, 2019

(51) Int. Cl.
| | | |
|---|---|---|
| *G02F 1/01* | (2006.01) | |
| *G06F 3/01* | (2006.01) | |
| *G02F 1/139* | (2006.01) | |
| *G02B 27/01* | (2006.01) | |
| *G06F 3/0484* | (2013.01) | |
| *G02B 27/28* | (2006.01) | |

(52) U.S. Cl.
CPC ....... *G02F 1/0136* (2013.01); *G02B 27/0101* (2013.01); *G02F 1/1393* (2013.01); *G06F 3/013* (2013.01); *G02B 27/281* (2013.01); *G02B 2027/0118* (2013.01); *G06F 3/04847* (2013.01)

(58) Field of Classification Search
CPC ......... G02F 1/133305; G02F 1/133536; G02F 1/0045; G02F 1/0136; G02F 1/13475; G02F 1/13725; G02F 2001/133543; G02F 2001/133545; G02F 2001/133548; G02F 1/133528; G02F 2203/01; G02F 1/13476; G02F 1/1393; G02F 2001/133531; G02F 2001/133638; G02F 2201/503; G02F 2203/02; G02F 2203/62; G02F 1/1323; G02F 1/13306; G06F 3/013; G06F 3/04847
USPC ........ 359/237–242, 270–273, 290–292, 295, 359/298
See application file for complete search history.

(56) References Cited

U.S. PATENT DOCUMENTS

| | | |
|---|---|---|
| 8,632,034 B2 | 1/2014 | Mitchell et al. |
| 2008/0158448 A1* | 7/2008 | Fernando .......... B32B 17/10036 349/16 |

(Continued)

OTHER PUBLICATIONS

"Polarization Control with Liquid Crystals," Meadowlark Optics, 2009-2010, pp. 45-62. http://www.meadowlark.com/store/catalog/2009_2010_LiquidCrystals%283%29.pdf.

*Primary Examiner* — Brandi N Thomas
(74) *Attorney, Agent, or Firm* — Womble Bond Dickinson (US) LLP

(57) ABSTRACT

A dimmable window apparatus is provided. The dimmable window apparatus includes a window including a first linear polarizing film and a second linear polarizing film, the first linear polarizing film and the second linear polarizing film having respectively a first axis of polarization and a second axis of polarization, the second axis of polarization being electronically-controllable. The apparatus further includes a processor coupled to the second linear polarizing film, and configured to control the second axis of polarization to thereby control the opacity of the window that is defined by the first axis of polarization and the second axis of polarization relative to one another.

21 Claims, 6 Drawing Sheets

(56) References Cited

U.S. PATENT DOCUMENTS

2015/0131850 A1* 5/2015 Qvarfordt ............... G06F 3/013
382/103
2016/0247319 A1* 8/2016 Nowatzyk .......... G02B 27/0172

* cited by examiner

DIMMABLE WINDOW APPARATUS AND VEHICLE INCLUDING THE SAME

TECHNOLOGICAL FIELD

The present disclosure relates generally to an electrically-dimmable window and, in particular, to a dimmable window apparatus and a vehicle implementing the same.

BACKGROUND

Electrically-dimmable windows have been proposed for use in aircraft to replace conventional window shades. Previously proposed electrically-dimmable windows rely on electric power applied to special materials in the windows in order to change or sustain window opacity. Typically, the use of electrically-dimmable windows in aircraft increases electrical power demands on on-board systems and, as a result, requires additional wiring; thereby rendering electrically-dimmable windows costly, and sometimes impractical to retrofit existing aircraft with. Moreover, typical electrically-dimmable windows are slow to change or sustain window opacity and there is limited ability to change and/or sustain window opacity in discrete regions of the window.

Therefore it would be desirable to have an apparatus and a vehicle including the same that overcomes at least some of the issues discussed above, as well as other possible issues.

BRIEF SUMMARY

Example implementations of the present disclosure are generally directed to a dimmable window apparatus and a vehicle implementing the same. Example implementations provide an electronically-controllable linear polarizing film with another linear polarizing film in order to control the opacity of a window, such as a window of a vehicle. Utilization of the present disclosure has the potential to significantly reduce power demands relative to typical electrically-dimmable windows that require electric power to both adjust the opacity of the window and maintain the opacity thereof. Additionally, the present disclosure provides the ability to adjust the opacity for an entirety of the window or at least discrete region(s) thereof, as compared with typical electrically-dimmable windows where the opacity of the entirety of the window is the only adjustment able to be made.

Example implementations are primarily described in the context of aircraft and aircraft windows, but windows of other types of vehicles (e.g., land vehicles, spacecraft, watercraft)—and even more generally other structures—are also contemplated. These other example implementations include head-up units in automobiles, portholes in ships and submarines, windshields in spacecraft, and the like. More generally, these example implementations include any window used for allowing ambient light, sound, and/or air therethrough including: windshields, helmet visors, sunroofs, head-up units, portholes, moon roofs, skylights, building windows, and the like.

The present disclosure thus includes, without limitation, the following example implementations.

Some example implementations provide a dimmable window apparatus comprising a window including a first linear polarizing film and a second linear polarizing film, the first linear polarizing film and the second linear polarizing film having respectively a first axis of polarization and a second axis of polarization, the second axis of polarization being electronically controllable; and a processor coupled to the second linear polarizing film, and configured to control the second axis of polarization to thereby control the opacity of the window that is defined by the first axis of polarization and the second axis of polarization relative to one another.

In some example implementations of the apparatus of any preceding example implementation, or any combination of any preceding example implementations, the apparatus further comprises an eye tracker coupled to the processor, and configured to detect a point of gaze on the window, the processor being configured to control the second axis of polarization in response to or based on the point of gaze.

In some example implementations of the apparatus of any preceding example implementation, or any combination of any preceding example implementations, the processor being configured to control the second axis of polarization includes being configured to control the second axis of polarization in response to detection of the point of gaze by the eye tracker.

In some example implementations of the apparatus of any preceding example implementation, or any combination of any preceding example implementations, the processor being configured to control the second axis of polarization includes being configured to determine a region of the window on which the point of gaze is detected by the eye tracker, and control the second axis of polarization for at least a portion of the second linear polarizing film within the region of the window.

In some example implementations of the apparatus of any preceding example implementation, or any combination of any preceding example implementations, the apparatus further comprises a light sensor coupled to the processor, and configured to detect light impinging on the window, the processor being configured to control the second axis of polarization in response to or based on the light.

In some example implementations of the apparatus of any preceding example implementation, or any combination of any preceding example implementations, the processor being configured to control the second axis of polarization includes being configured to control the second axis of polarization in response to detection of the light by the light sensor.

In some example implementations of the apparatus of any preceding example implementation, or any combination of any preceding example implementations, the processor being configured to control the second axis of polarization includes being configured to determine a region of the window on which the light is impinging, and control the second axis of polarization for at least a portion of the second linear polarizing film within the region of the window.

In some example implementations of the apparatus of any preceding example implementation, or any combination of any preceding example implementations, the apparatus further comprises a user input interface coupled to the processor, and configured to receive user input that indicates a user-selected dimness that defines a particular opacity of the window, wherein the processor being configured to control the second axis of polarization includes being configured to control the second axis of polarization to achieve the particular opacity of the window.

In some example implementations of the apparatus of any preceding example implementation, or any combination of any preceding example implementations, wherein the processor being configured to control the second axis of polarization includes being configured to selectively transmit a signal to the birefringent materials to thereby control the opacity of the window.

In some example implementations of the apparatus of any preceding example implementation, or any combination of any preceding example implementations, the processor being configured to selectively transmit the signal includes being configured to selectively transmit the signal having a level that determines an amount of change of the second axis of polarization.

Some example implementations provide a vehicle implementing the dimmable window apparatus, the vehicle comprising a panel defining a window opening therein; a window mounted in the window opening and comprising: a first linear polarizing film having a first axis of polarization, and a second linear polarizing film having a second axis of polarization, the second axis of polarization being electronically controllable; and a processor coupled to the second linear polarizing film, and configured to control the second axis of polarization to thereby control the opacity of the window that is defined by the first axis of polarization and the second axis of polarization relative to one another.

Some example implementations provide a method of producing a dimmable window apparatus comprising providing a window including a first linear polarizing film and a second linear polarizing film, the first linear polarizing film and the second linear polarizing film having respectively a first axis of polarization and a second axis of polarization, the second axis of polarization being electronically-controllable; and coupling a processor to the second linear polarizing film, the processor being configured to control the second axis of polarization to thereby control the opacity of the window that is defined by the first axis of polarization and the second axis of polarization relative to one another.

These and other features, examples, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its examples and example implementations, should be viewed as combinable, unless the context of the disclosure clearly dictates otherwise.

It will therefore be appreciated that this Brief Summary is provided merely for purposes of summarizing some example implementations so as to provide a basic understanding of some examples of the disclosure. Accordingly, it will be appreciated that the above described example implementations are merely examples and should not be construed to narrow the scope or spirit of the disclosure in any way. Other example implementations, examples and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

Figure 4:
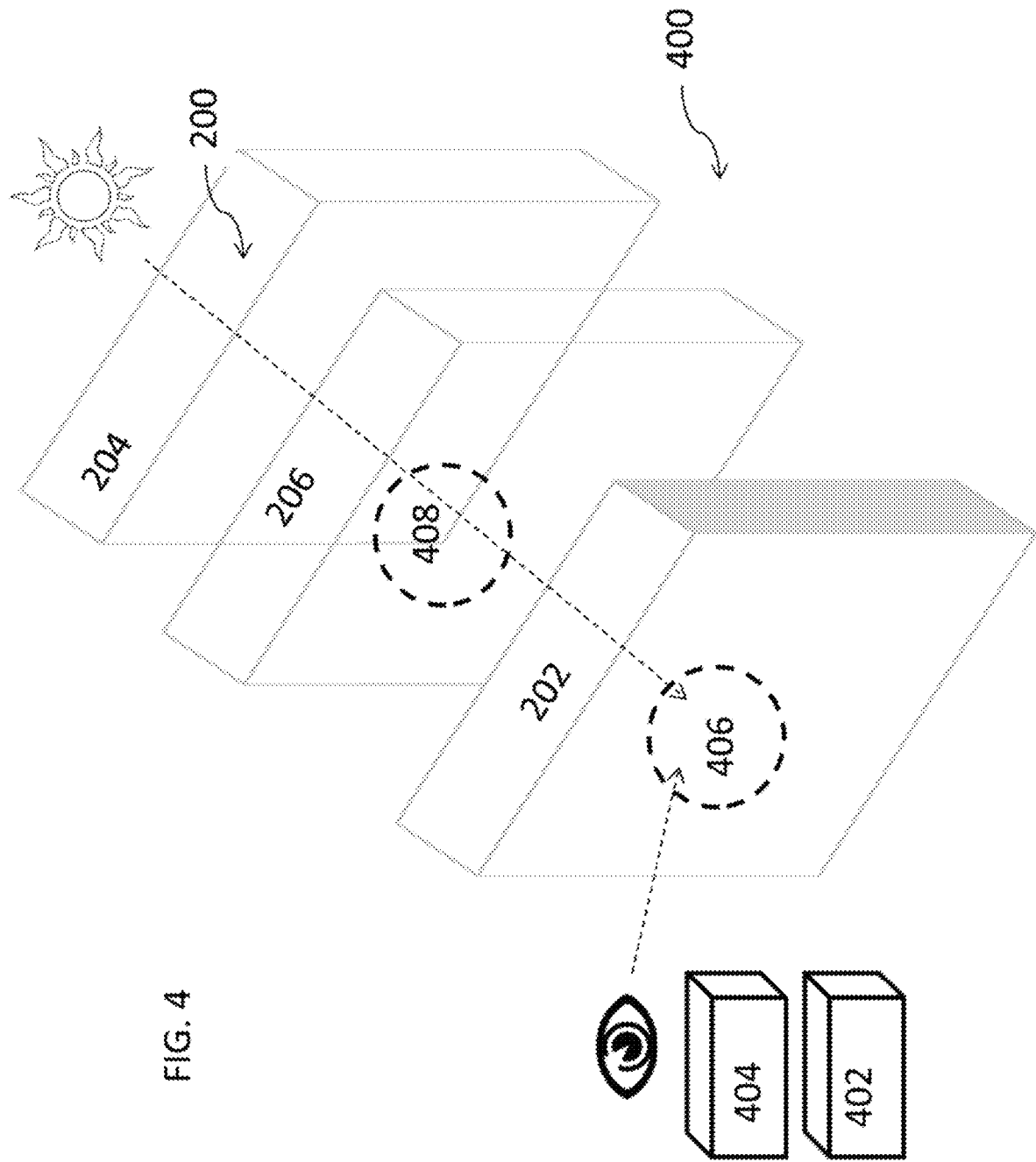
Figure 5:
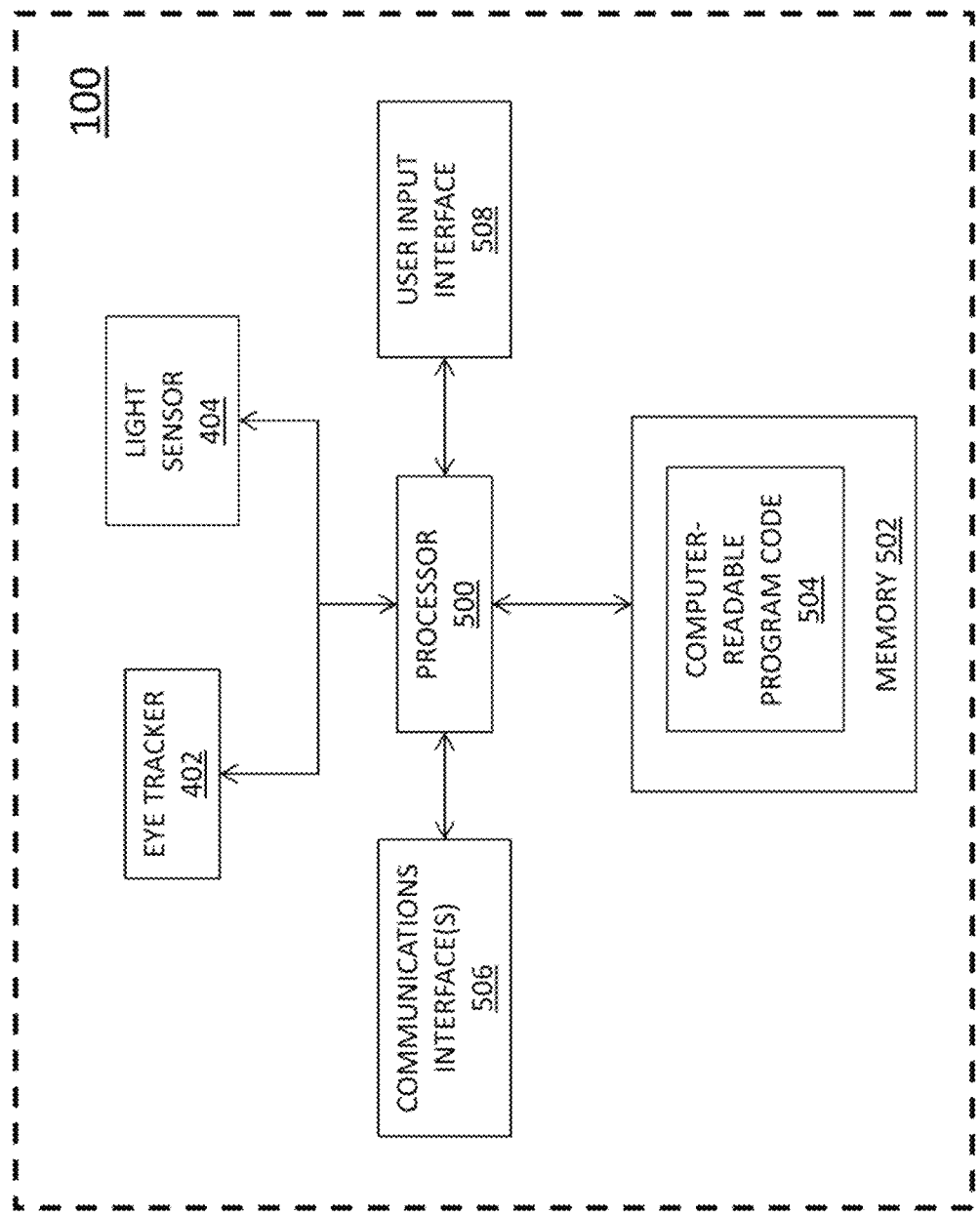
Figure 6:
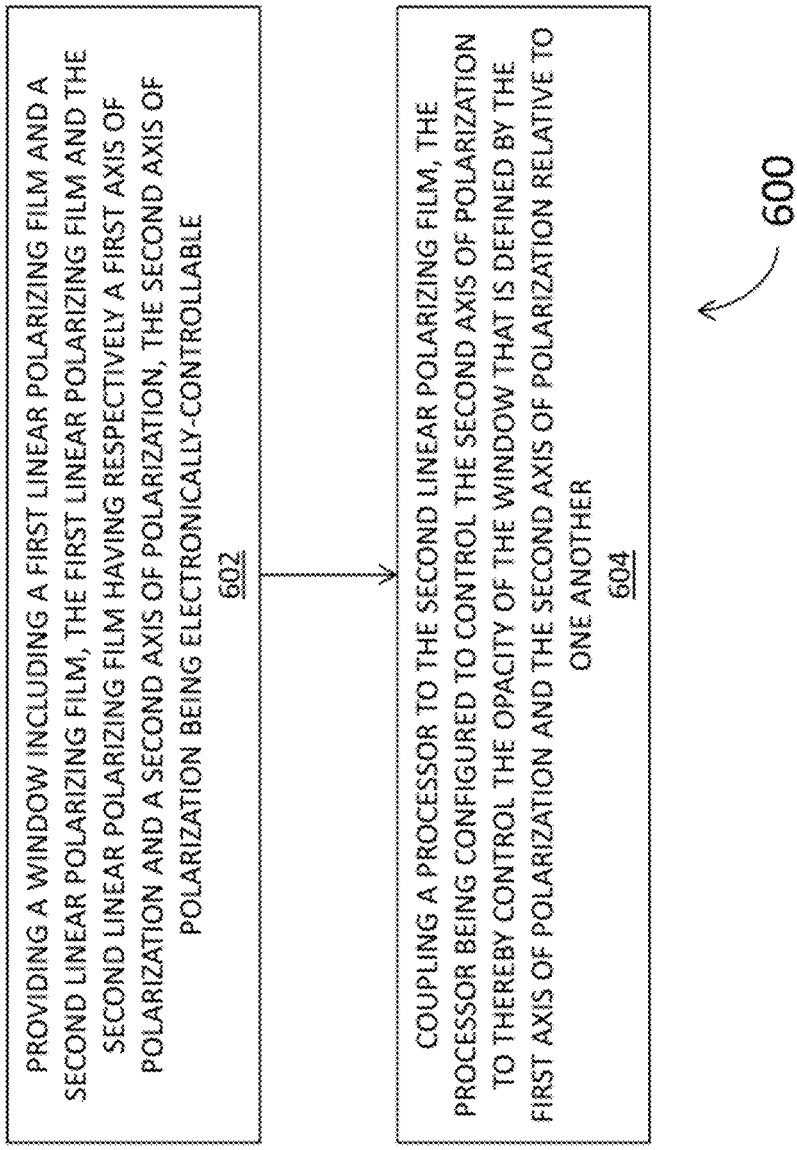

FIG. 4 illustrates a schematic illustration of window, a first linear polarizing film, and a second linear polarizing film where a point of gaze and/or impinging light is detected in order to control the second axis of polarization for at least a portion of the second linear polarizing film within a region of the window; and FIG. 5 illustrates a device according to some example implementations of the present disclosure; and FIG. 6 illustrates a flow diagram of a method of producing a dimmable window apparatus according to some example implementations of the present disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to a dimmable window apparatus and a vehicle implementing the same. As used herein, "dimmable" refers to the ability to control an axis of polarization of a film applied to a window, such that the resulting opacity of the window is affected. In some examples, the ability to electronically-control the opacity of the film is the ability to electrically control the opacity of the entirety of the film and/or control the opacity of discrete portions of the film depending on either one or both of a detected point of gaze on the window or ambient light impinging on the window.

Example implementations may be described in the context of one or more windows onboard an aircraft, but it should be understood that example implementations may be equally applicable to other types of windows onboard other vehicles. For example, implementations of the current disclosure may also be applicable to land vehicles, spacecraft, watercraft, and even more generally other structures including windows. Other example implementations include any other type of "window" or material that allows the passage of light, sound, and/or air therethrough, such as windshields, helmet visors, sunroofs, head-up units, portholes, moon roofs, skylights, building windows, etc.

An example implementation of the current invention includes electrically-controlling the opacity of a window onboard a vehicle, such as an aircraft. Currently, electrically-controlling the opacity of a window onboard a vehicle requires adjusting and/or maintaining window opacity throughout an entirety of the window using a sustained source of electrical energy. However, this current method of electrically-controlling the opacity tends to be costly in order to sustain the electrical power demands, is incapable of controlling the opacity of discrete regions of the window, and is relatively slow to dim.

Figure 1:
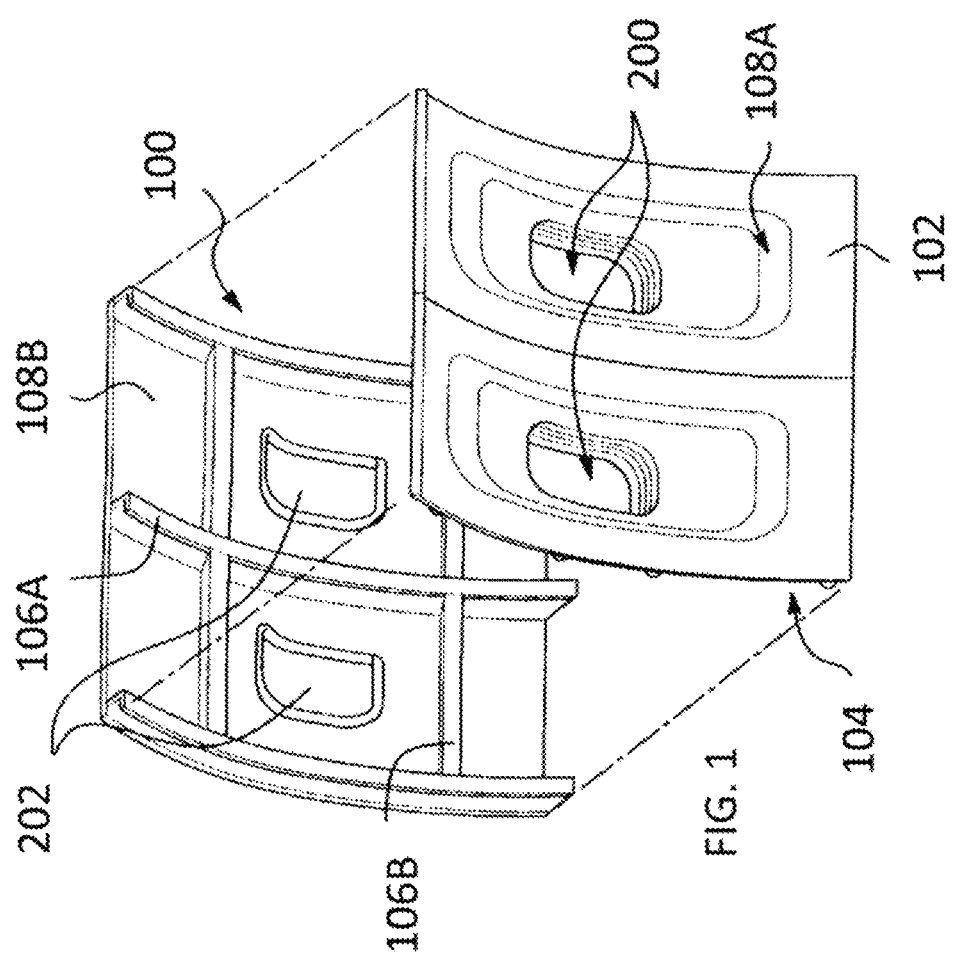
FIG. 1 is a schematic illustration of a vehicle including a panel defining a window opening and a window mounted in the window opening and including a dimmable window apparatus according to example implementations of the present disclosure.

FIG. 1 illustrates an example vehicle, generally designated 100. The vehicle 100 comprises, in some examples, an aircraft having a panel assembly including a panel 102 secured to an airframe 104 formed of vertical and horizontal members 106A, 106B. An outer skin 108A may be formed over the airframe. In some example implementations, the panel 102 may comprise a curved sidewall panel having a decorative inside face 108B exposed to an interior cabin environment. The panel 102 may include dimmable window apparatuses 200 including windows 202 facing towards the inside face 108B, securable to the panel 102 by one or more of upper clips, a lower latch pawl, seals, and the like.

The example vehicle illustrated in FIG. 1 may also be example of any other type of vehicle including windows or window-like materials such as that described hereinabove. For example, such vehicle 100 may include an automobile, a ship, a submarine, a spaceship, and the like. In another example, the vehicle 100 is not a vehicle at all, and is, instead, a house, building, or any other non-motorized object comprising windows.

Figure 2:
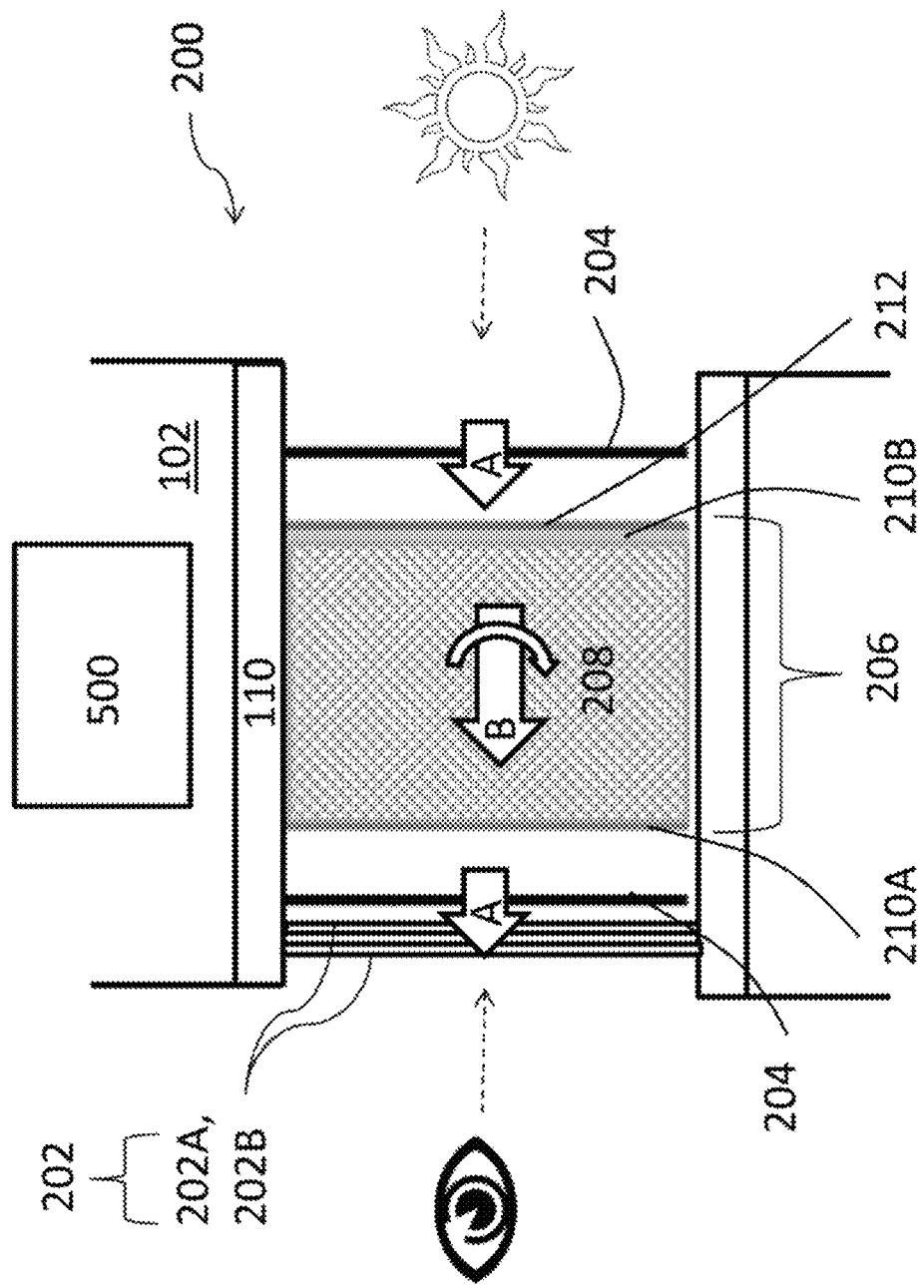
FIG. 2 is a schematic illustration of a dimmable window apparatus according to example implementations of the present disclosure.

As shown in FIG. 2, the dimmable window apparatus 200 comprises a window 202 that is capable of having its opacity controlled. More particularly, the structure of the window 202, itself, may be two structural window panes 202A, 202B separated by an airspace held within a frame 110 forming part of the panel 102. The dimmable window apparatus 200 may be disposed towards the outer skin 108A of the panel 102 or towards the inside face 108B. As illustrated in FIG. 2, the dimmable window apparatus is illustrated as provided towards an exterior of the panel 102, although any of the above implementations are contemplated.

The window 202 includes a first linear polarizing film 204 that may be provided proximate either the outer skin 108A or the inside face 108B of the panel 102. In some examples, the window 202 includes two first linear polarizing films 204 each of which is provided proximate a respective one of the outer skin 108A and the inside face 108B of the panel 102. The window 202 also includes a second linear polarizing film 206 that may be provided proximate the first linear polarizing film 204, or between the two first linear polarizing films 204. Other possible arrangements of the linear polarizing films 204, 206 and the window 202 are also contemplated.

Each of the first linear polarizing film 204 and the second linear polarizing film 206 is a linear polarizer in that it allows light waves of a specific polarization to pass and blocks light waves of other polarizations. The first linear polarizing film 204 has a first axis of polarization A, and the second linear polarizing film 206 has a second axis of polarization B. For light of undefined or mixed polarization that impinges the first linear polarizing film 204 opposite the second linear polarizing film 206, the first linear polarizing film 204 is configured to convert the impinging light into linearly-polarized light confined to a plane parallel to the first axis of polarization A, which is output from the first linear polarizing film 204 to the second linear polarizing film 206. Similarly, for light of undefined or mixed polarization that impinges the second linear polarizing film 206 opposite the first linear polarizing film 204, the second linear polarizing film 206 is configured to convert impinging light into linearly-polarized light confined to a plane parallel to the second axis of polarization B, which is output from the second linear polarizing film 206. Where there is any additional polarizing film, such as an additional first linear polarizing film 204, the light of undefined or mixed polarization that impinges the additional first linear polarizing film 204 opposite the second linear polarizing film 206, is converted into linearly-polarized light confined to a plane parallel to the first axis of polarization A, which is then output from the additional first linear polarizing film 204. For each polarizing film, the plane parallel to the axis of polarization often referred to as its plane of polarization.

According to example implementations of the present disclosure, at least the second axis of polarization B of the second polarizing film 206 is electronically-controllable. In some examples, the first axis of polarization A of the first linear polarizing film 204 is fixed. In other examples, the first axis of polarization A of the first linear polarizing film 204 is electronically-controllable. In these examples, the first axis of polarization A is electronically-controllable so that the first axis of polarization A is parallel relative to the second axis of polarization B, so that the first axis of polarization A is orthogonal relative to the second axis of polarization B, so that the first axis of polarization A is acute relative to the second axis of polarization B, etc.

Likewise, in still further examples, the second axis of polarization B of the second linear polarizing film 206 is electronically-controllable, so that the second axis of polarization B is parallel relative to the first axis of polarization A, so that the second axis of polarization B is orthogonal relative to the first axis of polarization A, so that the second axis of polarization B is acute relative to the first axis of polarization A, etc. Depending on the orientation of the axes A, B of the first linear polarizing film 204 and the second linear polarizing film 206, the opacity of the window 202 may be electronically-controlled based on the conversion of the impinging light into linearly-polarized light confined to a plane parallel to the relative axes of orientation.

More particularly, regardless of the one of the first or second linear polarizing films 204, 206 on which the light first impinges, the respective linear polarizing film 204, 206 converts the impinging light into linearly-polarized light that is directed to the other of the two linear polarizing films 204, 206. Depending on the orientations of the axes of polarization A, B relative to one another, the other of the two linear polarizing films 204, 206 may pass or at least partially (if not totally) block the linearly-polarized light.

Figure 3:
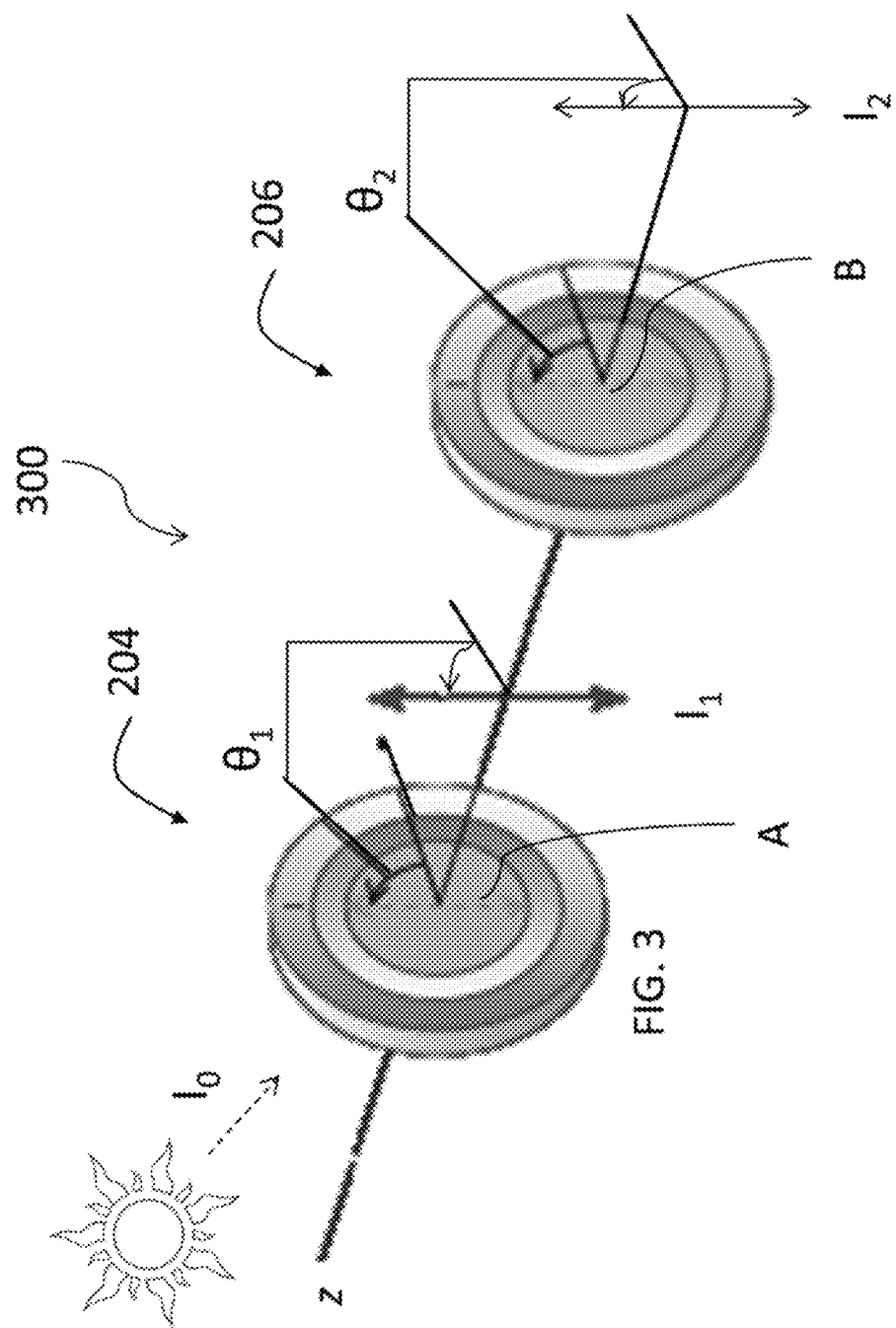
FIG. 3 is a schematic illustration of a first linear polarizing film having a first axis of polarization and a second linear polarizing film having a second axis of polarization according to example implementations of the present disclosure.

FIG. 3 more particularly illustrates the first linear polarizing film 204 and the second linear polarizing film 206 and the relative orientations of their axes of polarization A, B. FIG. 3 illustrates the first linear polarizing film 204 converting impinging light into linearly-polarized light, which is then directed to the second linear polarizing film 206. In the example in FIG. 3, the first linear polarizing film 204 has the first axis of polarization A that is fixed relative to the second axis of polarization B that is electronically-controllable into one or more different orientations relative to the first axis of polarization. The schematic, as shown in FIG. 3, illustrates the first axis of polarization A and the second axis of polarization B being oriented parallel relative to one another, although any orientation between the first axis of polarization A and the second axis of polarization B is contemplated herein.

In FIG. 3, impinging light has an initial intensity $I_0$ that is received at the first linear polarizing film 204 having the first axis of polarization A. The first linear polarizing film 204 is configured to quell the unaligned component of the impinging light, and convert the aligned component of the impinging light into linearly-polarized light with an intensity $I_1$ that is half the impinging light's intensity ($I_1=\frac{1}{2} I_0$). The linearly-polarized light having the intensity $I_1$ is then directed to the second linear polarizing film 206. The second linear polarizing film 206 is configured to receive the linearly-polarized light having the intensity $I_1$ and, depending on the orientation of the second axis of polarization B relative to the first axis of polarization A, quell the unaligned component of the linearly-polarized light and convert the aligned component of the linearly-polarized light into linearly-polarized light with an intensity $I_2$ that is a fraction of the linearly-polarized lights intensity $I_1$. That is, $I_2=I_1 \cos^2 \theta$, where $\theta$ is the angle measuring the amount of change between the axes of polarization A, B.

More specifically, the angle $\theta$ may be dependent on the orientation of the first axis of polarization A relative to the second axis of polarization B ($\theta=\theta_2-\theta_1$). As illustrated only as an example embodiment in FIG. 3, the second axis of polarization B is oriented parallel to the first axis of polarization A, such that relative to a particular, common frame of reference, $\theta_1$, $\theta_2$ are both 90 degrees. Thus, the angle $\theta$ between the axes of polarization is 0 degrees ($\theta=\theta_2-\theta_1=90°-90°=0°$). This results in the intensity $I_2$ being dependent solely on the intensity $I_1$ ($I_2=I_1 \cos^2 0°=I_1$) in FIG. 3.

Other orientations of the first axis of polarization A relative to the second axis of polarization B are also contemplated, and may result in other intensities $I_2$. In another example in which the second axis of polarization B is electronically-controlled to be perpendicular to the first axis of polarization A, $\theta_2=0°$, the angle between the axes $\theta=\theta_2-\theta_1=0°-90°=-90°$, and the intensity $I_2=I_1 \cos^2 \theta=I_1 \cos^2(-90)=0$.

In yet another example in which the second axis of polarization B is electronically-controlled such that the angle between the axes of polarization A, B is 45 degrees ($\theta=\theta_2-\theta_1=45°-90°=-45°$), the intensity $I_2=I_1 \cos^2 \theta=I_1 \cos^2(-45)=\frac{1}{2} I_1$. As such, the intensity $I_2$ relative to $I_1$ is a measure of the opacity of the window 202, and by electronically-controlling the second axis of polarization B and thereby $I_2$, the opacity of the window 202 is electronically-controllable. It should also be noted that the same result may be achieved in examples in which light from a source of light first impinges the second linear polarizing film 206, and the linearly-polarized light passed by it then impinges the first linear polarizing film 204.

Returning back to FIG. 2, and the example implementation disclosed thereby, in this manner, the second axis of polarization B may be electronically-controlled between a variety of orientations. Continuing with this example, the second linear polarizing film 206 may comprise birefringent materials 208 whose effective birefringence may be changed by varying a signal applied thereto. For example, the second linear polarizing film 206 may comprise nematic liquid crystals. The birefringent materials 208 may be fused or encapsulated between conductive materials 210A, 210B. The conductive materials 210A, 210B may comprise a transparent film, such as silica, which may or may not have a coating applied thereto. For example, the films 210A, 210B may comprise an indium tin oxide (ITO) coating applied thereto for its electrical conductivity and optical transparency. Other coatings such as aluminum-doped zinc oxide (AZO), indium-doped cadmium oxide, and inorganic alternatives such as gallium-doped zinc oxide (GZO) may be used as a coating as well.

The birefringent materials 208 encapsulated between the two conductive materials 210A, 210B may be anisotropic materials. The orientations of the birefringent materials 208 may be controlled, to thereby control the second axis of polarization B of the second linear polarizing film 206. To do so, in some example implementations, a signal may be selectively transmitted to the birefringent materials 208 and/or to the two conductive materials 210A, 210B. For example, the signal comprises an applied voltage configured to change the birefringence of the birefringent materials 208. In this example, when no voltage is applied to the second linear polarizing film 206, the first axis of polarization A and the second axis of polarization B are parallel in orientation. However, when a small level of voltage is applied to the second linear polarizing film 206, the second axis of polarization B is acute in orientation relative to the first axis of polarization A. As voltage increases from the small level of voltage, the second axis of polarization B becomes orthogonal in orientation relative to the first axis of polarization A. In this manner, the birefringent materials 208 may require an applied voltage only to reorient themselves, and thus the second axis of polarization B. No voltage is required to maintain the birefringent materials 208 (and the second axis of polarization B) in that orientation.

In some example implementations, thin-film-transistors (TFTs) 212 may be encapsulated between the conductive materials 210A, 210B in order to selectively control the second axis of polarization B for at least discrete portion(s) (see, e.g., 408, FIG. 4) of the second linear polarizing film 206. More specifically, the TFTs 212 may be utilized in order to apply the signal across discrete portion(s) of the second linear polarizing film 206 in order to change the second axis of polarization B within a specified portion thereof.

In some examples, the portion of the second linear polarizing film 206 that receives the applied signal may correspond to a symbol, graphic, text, etc., which may become visible upon electronically-controlling the second axis of polarization B for that portion of the second linear polarizing film 206. For example, where the dimmable window assembly 200 is utilized in a head-up display in an automobile, the second axis of polarization B for a portion of the second polarizing film 206 for that region of the window 202 may selectively receive a signal. In this example, the signal may darken at least that region of the window 202 so that an arrow is a generated for directions, a speed limit is generated, text traffic alerts are generated, and the like. The head-up display may also be configured to be selectively dimmed, such that portions of the second linear polarizing film 206 corresponding to the head-up display and/or symbols, graphics, text, etc., receive the applied signal when the head-up display is activated, and do not receive the applied signal when the head-up display is not activated.

In some example implementations, the vehicle 100 further comprises a processor 500 that may be used in controlling all manner of aspects of the vehicle 100. The processor 500 is coupled to the second linear polarizing film 206 and is configured to control the second axis of polarization B. The processor 500 may be electrically connected to an energy source such as, for example, an energy-harvesting device, the vehicle itself, etc., in order to receive power. In some example implementations, the processor 500 may be disposed within the panel 102 adjacent to or in proximity to the dimmable window assembly 200. In other example implementations, the processor 500 may be positioned or disposed separately from the dimmable window assembly 200 in the vehicle 100. In still further example implementations, the processor 500 may be coupled to two or more dimmable window assemblies 500 so that the processor 500 is configured to control the second axis of polarization B for more than one window 202.

For illustrative purposes only, the processor 500 will be described in relation to the dimmable window assembly 200, although the processor 500 may be coupled to one, two, three, four, or more window assemblies 200. Regardless, the processor 500 may be configured to control the second axis of polarization B by selectively transmitting the signal (e.g., an applied alternating current (AC) voltage) to the second linear polarizing film 206 and, more specifically, to the birefringent materials 208 and/or the conductive materials 210A, 210B, to control the opacity of the window 202.

Notably, the processor 500 may be configured to selectively transmit the signal having a level that determines the amount of change θ of the second axis of polarization B relative to the first axis of polarization A. Particularly, a higher level signal may result in a more opaque window 202 as the retardance of the birefringent materials 208 is increased (e.g., the second axis of polarization B becomes more orthogonal in orientation relative to the first axis of polarization A), while a lower level signal may result in a more transparent window 202 as the retardance of the birefringent materials 208 is decreased (e.g., the second axis of polarization B becomes less orthogonal in orientation relative to the first axis of polarization A).

In some example implementations, the selective transmittal of the signal may affect the entirety of the second linear polarizing film 206, while in other example implementations the selective transmittal of the signal may at least affect a portion of the second linear polarizing film 206. The processor 500 may be coupled with one or more peripherals, described in more detail below, which may determine which portions of the second linear polarizing film 206 are affected by the transmittal of the signal based on external stimuli.

FIG. 4 illustrates a schematic illustration generally designated 400 of the window 202, the first linear polarizing film 204, and the second linear polarizing film 206 as described in reference to FIG. 2 herein. FIG. 4 also illustrates additional peripherals provided with the vehicle 100 and/or the dimmable window apparatus 200 that transmit and/or receive information regarding external stimuli. For example, an eye tracker 402 and/or a light sensor 404 are provided, where each of the eye tracker 402 and the light sensor 404 is coupled to the processor 500, see, e.g., FIG. 5 and which may provide information on which the opacity and thereby the second axis of polarization B may be controlled.

The eye tracker 402 is, in some example implementations configured to detect a point of gaze on the window 202. The processor 500 may be configured to control the second axis of polarization B in response to or based on the point of gaze. As used herein "point of gaze" is defined as a line-of-sight relative to an inside face 108A of the vehicle. The eye tracker 402 may comprise a device for detecting and/or measuring eye positions and eye movement in order to determine the point of gaze. The eye tracker 402 may be disposed at an interior of the vehicle in order to detect the point of gaze on the window 202. The eye tracker 402 may comprise a video camera or other type of optical sensor that measures eye motion. Other methods of tracking and measuring eye motion in order to detect the point of gaze are also contemplated herein.

The processor 500 may be configured to control the second axis of polarization B in response to detection of the point of gaze by the eye tracker 402. More particularly, detection of the point of gaze by the eye tracker 402 may initiate the processor to selectively transmit the signal to the second linear polarizing film 206 so that power usage and subsequent controlling of the window opacity is based on the detection of a user's gaze on the window 202. This advantageously reduces power usage, such that the dimmable window apparatus 200 may not utilize power unless the user's gaze is detected on the window 202, and at least partially reduce intensity of light outside of the user's gaze, to reduce eye strain.

In some example implementations, the processor 500 may be configured to control the second axis of polarization B so that the opacity of the entirety of the window 202 or at least a region 406 thereof is controlled. Specifically, the processor 500 may be configured to determine a region 406 of the window 202 on which the point of gaze is detected by the eye tracker 402, and control the second axis of polarization B for at least a portion 408 of the second linear polarizing film 206 within the region 406 of the window 202. This may be accomplished by selectively transmitting the signal to the TFTs 212 within a portion of the second linear polarizing film 206 corresponding to the region 406 on the window 202 at which the point of gaze is detected by the eye tracker 402. In this manner, the signal may be discretely applied, so that the birefringent materials 208 encapsulated by the corresponding TFTs 212 between the conductive materials 210A, 210B will receive the signal and reorient themselves.

In some implementations, the light sensor 404 may be coupled to the processor 500 and is configured to detect light impinging on the window 202. The processor 500 may be configured to control the second axis of polarization B in response to or based on the impinging light. As used herein the "light impinging on the window" is defined as the ambient light striking the window and/or the linear polarizing films 204, 206. The light sensor 404 may comprise a device for detecting and/or measuring a position and/or intensity of ambient light on the window 202. The light sensor 404 may be disposed at an interior of the vehicle or on one of the window 202, the first linear polarizing film 204, and the second linear polarizing film 206 in order to detect the impinging light. The light sensor 404 may comprise a camera, a surface photodetector, a photoresistor, a photodiode, a phototransistor, or the like that detects and/or measures the position and/or intensity of impinging light. In some preferred implementations, the light sensor 404 is a camera disposed at an interior of the vehicle (e.g., FIG. 4) that detects an intensity of incoming light as a function of direction. Other methods of tracking and measuring light in order to detect the impinging light are also contemplated herein.

The processor 500 may be configured to control the second axis of polarization B in response to detection of the impinging light by the light sensor 404. More particularly, detection of the impinging light by the light sensor 404 may initiate the processor 500 to selectively transmit the signal to the second linear polarizing film 206 so that power usage and subsequent controlling of the window opacity is based on the detection of impinging light. This advantageously reduces power usage, such that the dimmable window apparatus 200 may not utilize power at night, during dark days, etc.

In some example implementations, the processor 500 may be configured to control the second axis of polarization B so that the opacity of the entirety of the window 202 or at least a region 406 thereof is controlled. Specifically, the processor 500 may be configured to determine a region 406 of the window 202 on which the light is impinging, and control the second axis of polarization B for at least a portion 408 of the second linear polarizing film 206 within the region 406 of the window 202. This may be accomplished by selectively transmitting the signal to the TFTs 212 within a portion of the second linear polarizing film 206 corresponding to the region 406 on the window 202 at which the impinging light is detected by the light sensor 404. In this manner, the signal may be discretely applied, so that the birefringent materials 208 encapsulated by the corresponding TFTs 212 between the conductive materials 210A, 210B will receive the signal and reorient themselves.

In some example implementations, the processor 500 may be configured to control portion(s) 408 of the second axis of polarization B so that region(s) 406 of the window 202 are controlled in response to a region of the window 202 on which the point of gaze is detected by the eye tracker 402 and a region of the window 202 on which the light is impinging. In these implementations, the region of the window 202 on which the point of gaze is detected by the eye tracker 402 and a region of the window 202 on which the light is impinging may be overlapping, wholly separate regions, or the same regions. Regardless, the processor 500 may be configured compare the region of the window 202 on which the point of gaze is detected by the eye tracker 402 and the region of the window 202 on which the light is impinging, and control the second axis of polarization B for the portion(s) of the second linear polarizing film 206 within the region(s) of the window 202 based thereon.

This may be accomplished by selectively transmitting the signal to the TFTs 212 within a portion of the second linear polarizing film 206 corresponding to the region 406 on the window 202 at which the impinging light is detected by the light sensor 404 and the point of gaze is detected by the eye tracker 402. In this manner, the signal may be discretely applied, so that at least those birefringent materials 208 encapsulated by the corresponding TFTs 212 between the conductive materials 210A, 210B will receive the signal and reorient themselves. For example, in a head-up display in an automobile, the windshield may increase in opacity at least in regions 406 of the head-up display where the light is impinging on the driver's eyes, but the remaining regions of the windshield may remain transparent.

FIG. 5 illustrates an example implementation of the vehicle 100 (e.g., FIG. 1) having a device including the processor 500. The device may be embodied as one or more fixed or portable electronic device. Examples of suitable electronic devices include a workstation computer, server computer or the like. The device may include one or more of each of a number of components such as, for example, the processor 500 connected to a memory 502 (e.g., storage device).

The processor 500 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor 500 may be configured to execute computer programs, which may be stored onboard the processor or otherwise stored in the memory 502 (of the same or another device).

The processor 500 may be a number of processors, a multi-core processor or some other type of processor, depending on the particular implementation. Further, the processor 500 may be implemented using a number of heterogeneous processor systems in which a main processor is present with one or more secondary processors on a single chip. As another illustrative example, the processor 500 may be a symmetric multi-processor system containing multiple processors of the same type. In yet another example, the processor 500 may be embodied as or otherwise include one or more ASICs, FPGAs or the like. Thus, although the processor 500 may be capable of executing a computer program to perform one or more functions, the processor of various examples may be capable of performing one or more functions without the aid of a computer program. In either instance, the processor 500 may be appropriately programmed to perform functions or operations according to example implementations of the present disclosure.

The memory 502 is generally any piece of computer hardware that is capable of storing information such as, for example, data, computer programs (e.g., computer-readable program code 504) and/or other suitable information either on a temporary basis and/or a permanent basis. The memory may include volatile and/or non-volatile memory, and may be fixed or removable. In addition to the memory 502, the processor 500 may also be coupled to one or more interfaces for displaying, transmitting and/or receiving information. The communications interface 506 may be configured to transmit and/or receive information by physical (wired) and/or wireless communications links.

In some implementations, the processor 500 may be further coupled to one or more user input interfaces 508 (e.g., input/output unit). The user input interfaces 508 may be wired or wireless, and may be configured to receive information from a user into the device, such as for processing, storage and/or display. In some example implementations, the user input interfaces 508 may be configured to receive user input that indicates a user-selected dimness that defines a particular opacity of the window 202. The user may be able to select a desired dimness level between opaque, translucent (semitransparent), and transparent using an actuation mechanism such as a knob or slider affixed to the inside surface 108B of the panel 102. Various gradations of translucency may be selectable by the user, as the second axis of polarization B may be electronically-controllable relative to the first axis of polarization A by selectively controlling the level of the signal transmitted to the second linear polarizing film 206. As such, the processor 500 is configured to control the second axis of polarization B based on the user input (e.g., transmit a signal level based on the user-selected dimness) to the second linear polarizing film 206 to achieve the particular opacity of the window 202.

In this manner, a device may include processing circuitry including a processor 500 and a computer-readable storage medium or memory 502 coupled to the processor, where the processor is configured to execute computer-readable program code 504 stored in the memory. It will also be understood that one or more functions, and combinations of functions, may be implemented by special purpose hardware-based computer systems and/or processor which perform the specified functions, or combinations of special purpose hardware and program code instructions.

FIG. 6 illustrates a method flow diagram, generally referred to as 600, of a method of producing a dimmable window apparatus. method 600 includes a first step, 602, of providing a window including a first linear polarizing film and a second linear polarizing film, the first linear polarizing film and the second linear polarizing film having respectively a first axis of polarization and a second axis of polarization, the second axis of polarization being electronically-controllable. The method 600 includes a second step, 604, of coupling a processor to the second linear polarizing film, the processor being configured to control the second axis of polarization to thereby control the opacity of the window that is defined by the first axis of polarization and the second axis of polarization relative to one another.

The method 600 may comprise additional steps such as selectively transmitting a signal to the second linear polarizing film to control the second axis of polarization and thereby control the opacity of the window, the second linear polarizing film comprising birefringent materials configured to receive the signal. Further, the method 600 may comprise transmitting a signal having a level that determines an amount of change of the second axis of polarization. The method 600 may comprise additional steps such as those described herein in reference to the apparatus and vehicle. Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A dimmable window apparatus comprising:
   a window including a first linear polarizing film and a second linear polarizing film, the first linear polarizing film and the second linear polarizing film having respectively a first axis of polarization and a second axis of polarization, the second axis of polarization being electronically-controllable;
   an eye tracker arranged to measure a position and movement of a user's eye in order to determine a point of gaze on the window; and
   a processor coupled to the eye tracker and coupled to the second linear polarizing film, and configured to control the second axis of polarization in response to or based on the point of gaze determined by measurement of the position and movement of the user's eye, and thereby control the opacity of the window that is defined by the first axis of polarization and the second axis of polarization relative to one another.

2. The dimmable window apparatus of claim 1, wherein the processor being configured to control the second axis of polarization includes being configured to control the second axis of polarization in response to the point of gaze determined by measurement of the position and movement of the user's eye by the eye tracker.

3. The dimmable window apparatus of claim 1, wherein the processor being configured to control the second axis of polarization includes being configured to determine a region of the window on which the point of gaze is detected as determined by measurement of the position and movement of the user's eye by the eye tracker, and control the second axis of polarization for at least a portion of the second linear polarizing film within the region of the window.

4. The dimmable window apparatus of claim 1, further comprising a light sensor coupled to the processor, and configured to detect light impinging on the window, the processor being configured to control the second axis of polarization in response to or based on the light.

5. The dimmable window apparatus of claim 4, wherein the processor being configured to control the second axis of polarization includes being configured to control the second axis of polarization in response to detection of the light by the light sensor.

6. The dimmable window apparatus of claim 4, wherein the processor being configured to control the second axis of polarization includes being configured to determine a region of the window on which the light is impinging, and control the second axis of polarization for at least a portion of the second linear polarizing film within the region of the window.

7. The dimmable window apparatus of claim 1, further comprising a user input interface coupled to the processor, and configured to receive user input that indicates a user-selected dimness that defines a particular opacity of the window, wherein the processor being configured to control the second axis of polarization includes being configured to control the second axis of polarization to achieve the particular opacity of the window.

8. The dimmable window apparatus of claim 1, wherein the second linear polarizing film comprises birefringent materials, wherein the processor being configured to control the second axis of polarization includes being configured to selectively transmit a signal to the birefringent materials to thereby control the opacity of the window.

9. The dimmable window apparatus of claim 8, wherein the processor being configured to selectively transmit the signal includes being configured to selectively transmit the signal having a level that determines an amount of change of the second axis of polarization.

10. A vehicle comprising:
    a panel defining a window opening therein;
    a window mounted in the window opening and comprising:
      a first linear polarizing film having a first axis of polarization, and
      a second linear polarizing film having a second axis of polarization, the second axis of polarization being electronically-controllable;
    an eye tracker arranged to measure a position and movement of a user's eye in order to determine a point of gaze on the window; and
    a processor coupled to the eye tracker and coupled to the second linear polarizing film, and configured to control the second axis of polarization in response to or based on the point of gaze determined by measurement of the position and movement of the user's eye, and thereby control the opacity of the window that is defined by the first axis of polarization and the second axis of polarization relative to one another.

11. The vehicle of claim 10, wherein the processor being configured to control the second axis of polarization includes being configured to control the second axis of polarization in response to the point of gaze determined by measurement of the position and movement of the user's eye by the eye tracker.

12. The vehicle of claim 10, wherein the processor being configured to control the second axis of polarization includes being configured to determine a region of the window on which the point of gaze is detected as determined by measurement of the position and movement of the user's eye by the eye tracker, and control the second axis of polarization for at least a portion of the second linear polarizing film within the region of the window.

13. The vehicle of claim 10, further comprising a light sensor coupled to the processor, and configured to detect light impinging on the window, the processor being configured to control the second axis of polarization in response to or based on the light.

14. The vehicle of claim 13, wherein the processor being configured to control the second axis of polarization includes being configured to control the second axis of polarization in response to detection of the light by the light sensor.

15. The vehicle of claim 13, wherein the processor being configured to control the second axis of polarization includes being configured to determine a region of the window on which the light is impinging, and control the second axis of polarization for at least a portion of the second linear polarizing film within the region of the window.

16. The vehicle of claim 10, further comprising a user input interface coupled to the processor, and configured to receive user input that indicates a user-selected dimness that defines a particular opacity of the window, wherein the processor being configured to control the second axis of polarization includes being configured to control the second axis of polarization to achieve the particular opacity of the window.

17. The vehicle of claim 10, wherein the second linear polarizing film comprises birefringent materials, wherein the processor being configured to control the second axis of polarization includes being configured to selectively transmit a signal to the birefringent materials to thereby control the opacity of the window.

18. The vehicle of claim 10, wherein the processor being configured to selectively transmit the signal includes being configured to selectively transmit the signal having a level that determines an amount of change of the second axis of polarization.

19. A method of producing a dimmable window apparatus comprising:
   providing a window including a first linear polarizing film and a second linear polarizing film, the first linear polarizing film and the second linear polarizing film having respectively a first axis of polarization and a second axis of polarization, the second axis of polarization being electronically-controllable; and
   coupling a processor to the second linear polarizing film, the processor being configured to control the second axis of polarization to thereby control the opacity of the window that is defined by the first axis of polarization and the second axis of polarization relative to one another.

20. The method of claim 19, further comprising selectively transmitting a signal to the second linear polarizing film to control the second axis of polarization and thereby control the opacity of the window, the second linear polarizing film comprising birefringent materials configured to receive the signal.

21. The method of claim 20, wherein selectively transmitting the signal comprises selectively transmitting a signal having a level that determines an amount of change of the second axis of polarization.

* * * * *